US009313061B2

(12) United States Patent
Nieto

(10) Patent No.: US 9,313,061 B2
(45) Date of Patent: *Apr. 12, 2016

(54) WIRELESS COMMUNICATION SYSTEM USING SELECTIVE MAPPING FOR MEMORY-LESS DEMODULATION AND RELATED METHODS

(75) Inventor: John W. Nieto, Rochester, NY (US)

(73) Assignee: HARRIS CORPORATION, Melbourne, FL (US)

( * ) Notice: Subject to any disclaimer, the term of this patent is extended or adjusted under 35 U.S.C. 154(b) by 576 days.

This patent is subject to a terminal disclaimer.

(21) Appl. No.: 12/337,246

(22) Filed: Dec. 17, 2008

(65) Prior Publication Data

US 2010/0150261 A1 Jun. 17, 2010

(51) Int. Cl.
*H04L 27/18* (2006.01)
*H04L 27/22* (2006.01)
*H04L 25/02* (2006.01)
*H04L 25/06* (2006.01)

(52) U.S. Cl.
CPC ............ *H04L 27/22* (2013.01); *H04L 25/0228* (2013.01); *H04L 25/067* (2013.01)

(58) Field of Classification Search
USPC ......................................................... 375/279
See application file for complete search history.

(56) References Cited

U.S. PATENT DOCUMENTS

| 5,090,026 | A | * | 2/1992 | Stern et al. ..................... 375/274 |
| 5,633,893 | A | * | 5/1997 | Lampe et al. ................. 375/297 |
| 5,748,680 | A | * | 5/1998 | Mobin ........................... 375/317 |
| 6,175,726 | B1 | * | 1/2001 | Sydon ............................ 455/209 |
| 6,850,493 | B1 | * | 2/2005 | Ojard et al. .................... 370/252 |
| 6,968,021 | B1 | * | 11/2005 | White et al. ................... 375/340 |
| 7,003,049 | B2 | * | 2/2006 | Hietala .......................... 375/295 |
| 7,072,414 | B1 | * | 7/2006 | Lui et al. ....................... 375/274 |
| 7,088,793 | B1 | | 8/2006 | Mickelson et al. |
| 7,266,160 | B2 | * | 9/2007 | Kocic et al. ................... 375/319 |
| 2002/0159535 | A1 | * | 10/2002 | Agami et al. ................. 375/261 |
| 2006/0274641 | A1 | | 12/2006 | Grieco et al. ................. 370/210 |
| 2007/0189406 | A1 | * | 8/2007 | Kim et al. ..................... 375/260 |
| 2008/0039024 | A1 | | 2/2008 | Ikeda et al. ..................... 455/73 |

OTHER PUBLICATIONS

Jun Lee, Broadband Technology "Principles of spread-spectrum communications",www.rfdesign.com, Aug. 2007.
John Nieto, "An Investigation of Constant-Envelope Variations of OFDM Waveforms for Use on HF Multipath Fading Channels".
Steve C. Thompson, University of California, San Diego, "Constant Envelope OFDM Phase Modulation", 2005, pp. 1-211.
Patait, "Efficient GMSKmsk Modulator Targets GSM Designs," Jul. 8, 2002, 6 pages.

* cited by examiner

*Primary Examiner* — Lihong Yu
(74) *Attorney, Agent, or Firm* — Allen, Dyer, Doppelt, Milbrath & Gilchrist, P.A.

(57) ABSTRACT

A wireless communication system may include a first wireless communications device, and a second wireless communications device. The first wireless communications device may include a wireless transmitter, and a modulator coupled to the wireless transmitter for modulating input data to generate a Gaussian phase shift keyed signal having a selected data symbol mapping. The second wireless communications device may include a wireless receiver, and a demodulator coupled to the wireless receiver for demodulating the Gaussian phase shift keyed signal using memory-less symbol decisions based upon the selected data symbol mapping.

10 Claims, 5 Drawing Sheets

PS=PHASE STATE

WIRELESS COMMUNICATION SYSTEM USING SELECTIVE MAPPING FOR MEMORY-LESS DEMODULATION AND RELATED METHODS

FIELD OF THE INVENTION

The present invention relates to the field of communications, and, more particularly, to portable communications devices using Gaussian phase shift keyed signals and related methods.

BACKGROUND OF THE INVENTION

Mobile communications devices have become an integral part of society over the last two decades. Indeed, more than eighty-two percent of Americans own a mobile communications device, for example, a cell phone. The typical mobile communications device includes an antenna, and a transceiver coupled to the antenna. The transceiver and the antenna cooperate to transmit and receive communications signals.

The typical transceiver includes a power amplifier for amplifying low voltage signals for transmission via the antenna. Given that most mobile communications devices operate on limited battery power, energy efficient power amplifiers may be desirable. More specifically and as will be appreciated by those skilled in the art, Class C and E power amplifiers are common in mobile communications devices since they are efficient power amplifiers. These classes of power amplifiers are more efficient than Class A or B amplifiers, for example, but are subject to performance tradeoffs. For example, they may be nonlinear over certain frequencies and may introduce greater amounts of distortion into the amplified signal (if the signal requires a linear amplifier).

An approach to compensating for this tradeoff is to encode transmitted signals with constant envelope (CE) or continuous phase modulation (CPM) waveforms. These modulations provide for lower energy demands on the power amplifier of the transceiver, for example, by reducing the peak to average power ratio (PAPR), increasing average transmit power (providing greater transmission range), and increasing amplifier efficiency.

For example, U.S. Patent Application Publication No. 2008/0039024 to Ikeda et al. discloses an amplifying circuit. The amplifying circuit processes an input orthogonal frequency-division multiplexing (OFDM) signal and provides a pair of CE output signals to provide better power efficiency and less distortion. A particularly advantageous approach is constant envelope orthogonal frequency-division multiplexing (CE-OFDM).

Another approach is Gaussian minimum shift keying (GMSK) modulations, which are part of the CPM waveform family. In a typical GMSK device, the digital data stream is first shaped with a Gaussian filter before being applied to a frequency modulator. This reduces sideband power, thereby reducing out-of-band interference between signal carriers in adjacent frequency channels.

A potential drawback to CPM and CE waveforms, for example, GMSK, may include use of complex memory based modulations at the transmitter wireless device. Use of such memory-based modulations typically increases the computational requirements at the receiver wireless device. More specifically, the typical memory based demodulator may include a maximum likelihood sequence estimator, which is computationally intensive and increases the required processing at the receiver wireless communications device. Further, the use of these complex computational devices is undesirable since they may reduce battery life.

SUMMARY OF THE INVENTION

In view of the foregoing background, it is therefore an object of the present invention to provide a wireless communication system with efficient transmission capabilities.

This and other objects, features, and advantages in accordance with the present invention are provided by a wireless communication system comprising a first wireless communications device including a wireless transmitter, and a modulator coupled to the wireless transmitter for modulating input data to generate a Gaussian phase shift keyed signal having a selected data symbol mapping. The wireless communication system also may include a second wireless communications device comprising a wireless receiver, and a demodulator coupled to the wireless receiver for demodulating the Gaussian phase shift keyed signal using memory-less symbol decisions based upon the selected data symbol mapping. Advantageously, the selected data symbol mapping may reduce the computational processing at the second wireless communications device. Moreover, the computational processing reduction at the wireless receiver may be realized in a block equalization process, i.e. a memory-less symbol clamping device, and soft decision generation process.

More specifically, the modulator may have a modulation index of 0.25. For example, the Gaussian phase shift keyed signal may have 8 phase states, each phase state being spaced apart by 45 degrees.

Additionally, the modulator may selectively map the input data using memory by at least mapping the input data based upon at least one of a prior phase state of the Gaussian phase shift keyed signal and a current phase state of the Gaussian phase shift keyed signal. The modulator may selectively map the input data into phase states adjacent to the prior phase state of the Gaussian phase shift keyed signal.

In some embodiments, the modulator may modulate the input data to define a frame structure including a known portion, a time-varying portion, and an unknown portion. For example, the unknown portion, the time-varying portion, and the known portion may include 256, 4, and 32 data symbols, respectively. For example, the unknown portion, the time-varying portion, and the known portion may include 512, 4, and 64 data symbols, respectively. Furthermore, the Gaussian phase shift keyed signal may have a Gaussian shaped pulse spread across three data symbols.

Another aspect is directed to a wireless communications device. The wireless communications device may include a wireless transmitter, and a modulator coupled to the wireless transmitter for modulating input data to generate a Gaussian phase shift keyed signal having a selected data symbol mapping and having a modulation index of 0.25.

Yet another aspect is directed to a method for operating a wireless communication system having a first wireless communications device and a second wireless communications device communicating therewith. The method may include modulating at the first wireless communications device input data to generate a Gaussian phase shift keyed signal having a selected data symbol mapping, and demodulating at the second wireless communications device the Gaussian phase shift keyed signal using memory-less symbol decisions based upon the selected data symbol mapping.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
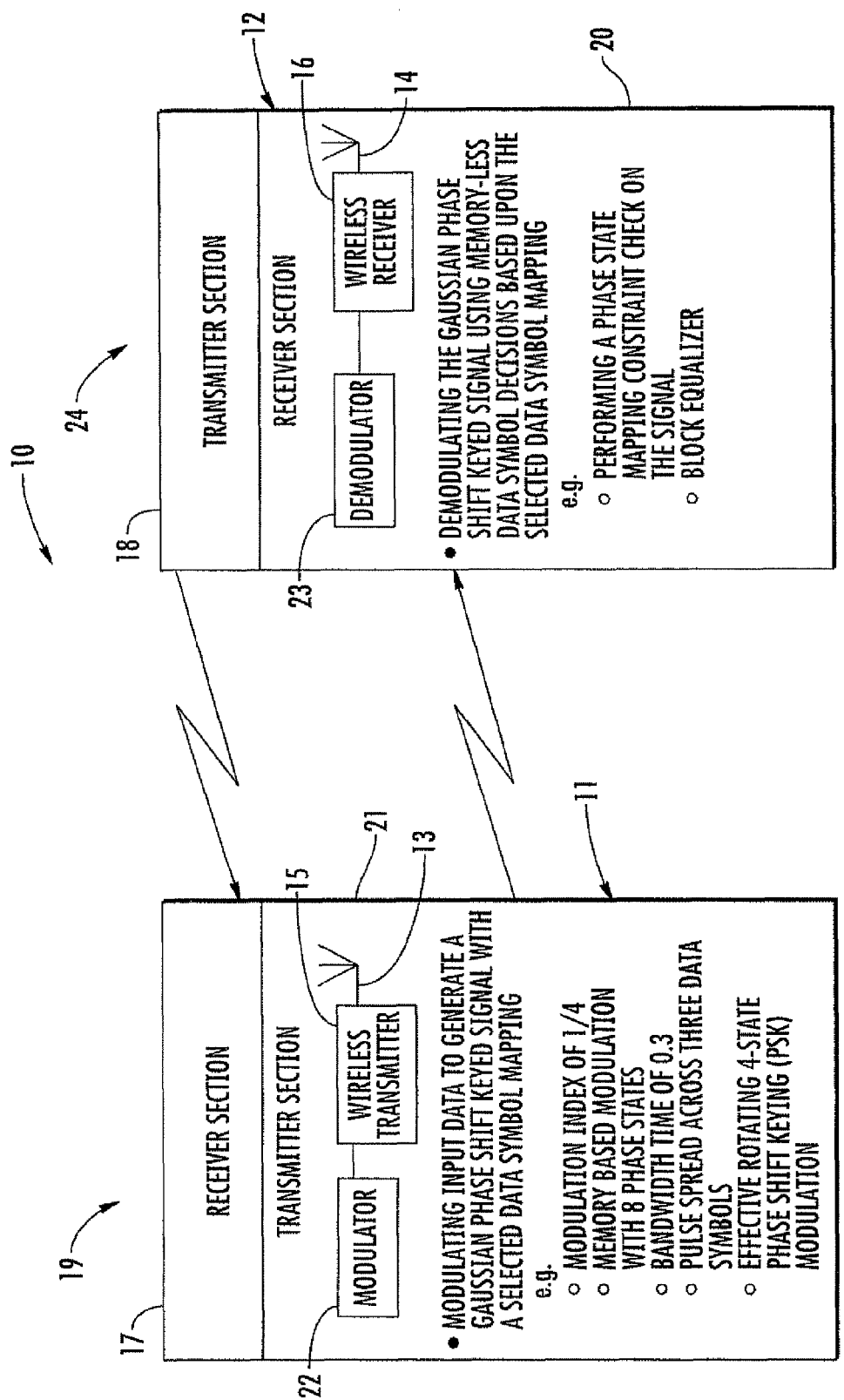
FIG. 1 is a schematic diagram of a wireless communication system according to the present invention.

Referring initially to FIG. 1, a wireless communication system 10 according to the present invention is now described. The wireless communication system 10 illustratively includes a first wireless communications device 19 communicating with a second wireless communications device 24. Each wireless communications device 19, 24 illustratively includes respective receiver 17, 12 and transmitter sections 11, 18, respectively. The transmitter section 11 of the first wireless communications device 19 and the receiver section 12 of the second wireless communications device 24 are shown in detail. As will be appreciated by those skilled in the art, the receiver section 17 of the first wireless communications device 19 and the transmitter section 18 of the second wireless communications device 24 may be similarly constituted to their counterparts.

The transmitter section 11 illustratively includes a wireless transmitter 15, an antenna 13 coupled to the wireless transmitter, and a modulator 22 coupled to the wireless transmitter for modulating input data to generate a Gaussian phase shift keyed signal having a selected data symbol mapping, i.e. the selected binary input data to Gaussian minimum shift keying (GMSK) symbol mapping. The first wireless communications device 19 also illustratively includes a housing 21, for example, a plastic or rubberized housing, carrying these internal components, thereby providing helpful mechanical robustness for mobile applications. More specifically, the Gaussian phase shift keyed signal may use a binary continuous phase modulation (CPM).

More specifically, the modulator 22 may have a modulation index of 0.25. The Gaussian phase shift keyed signal may have a Gaussian shaped phase pulse with a bandwidth time product (BT) of 0.3, and the Gaussian phase shift keyed signal may have a Gaussian shaped pulse spread across three data symbols. The Gaussian phase shift keyed signal may have an effective rotating 4-ary phase shift keying modulation, i.e. 4PSK or QPSK.

Figure 2:
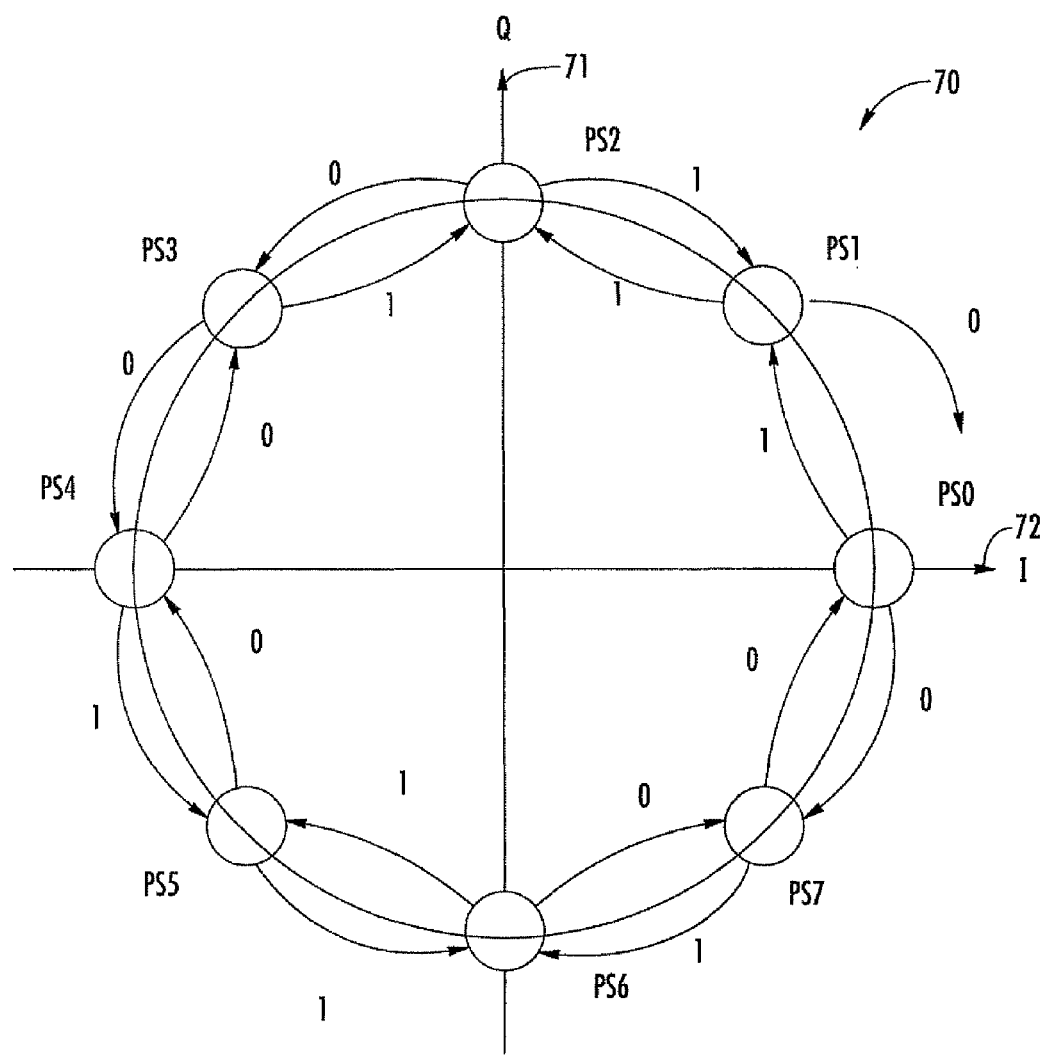
FIG. 2 is a constellation diagram illustrating the selected data symbol mapping of the wireless communication system of FIG. 1.

Referring briefly and additionally to FIG. 2, the selective mapping of input data to GMSK data symbols in the first wireless communications device 19 (transmitter section 11) is illustrated with a constellation diagram 70 defined by a real axis 71 and an imaginary axis 72. The constellation diagram 70 illustratively includes 8 phase states (0-7) for the Gaussian phase shift keyed signal, the phase state illustratively spaced apart by 45 degrees ($\pi/4$ radians). As will be appreciated by those skilled in the art, the arrows shown in FIG. 2 determine whether a positive or negative frequency are used to travel from current phase state to next phase state. Counterclockwise direction is a positive frequency and clockwise direction is a negative frequency.

Additionally, the modulator 22 selectively maps the input data using memory by at least mapping the input data based upon at least one of a prior phase state of the Gaussian phase shift keyed signal and a current phase state of the Gaussian phase shift keyed signal. For example, phase state 0 may move to either phase state 7 (−45 degrees: clockwise-negative frequency) or phase state 1 (+45 degrees: counterclockwise-positive frequency). More specifically, for phase state 0, when the modulated input data symbol is 1, the modulation moves to phase state 1, and when the modulated input data symbol is 0, the modulation moves to phase state 7. In other words, the modulator 22 may selectively map the input data symbols to GMSK phase trajectories directly adjacent to the prior phase state of the Gaussian phase shift keyed signal. As will be appreciated by those skilled in the art, the selective mapping in FIG. 2 differs from standard GMSK mapping by having the mapping of the input 0 and 1 data behaving differently depending on the phase state, i.e. a 0 or 1 input can move both clockwise and counterclockwise, based on the current GMSK phase state.

Figure 3:
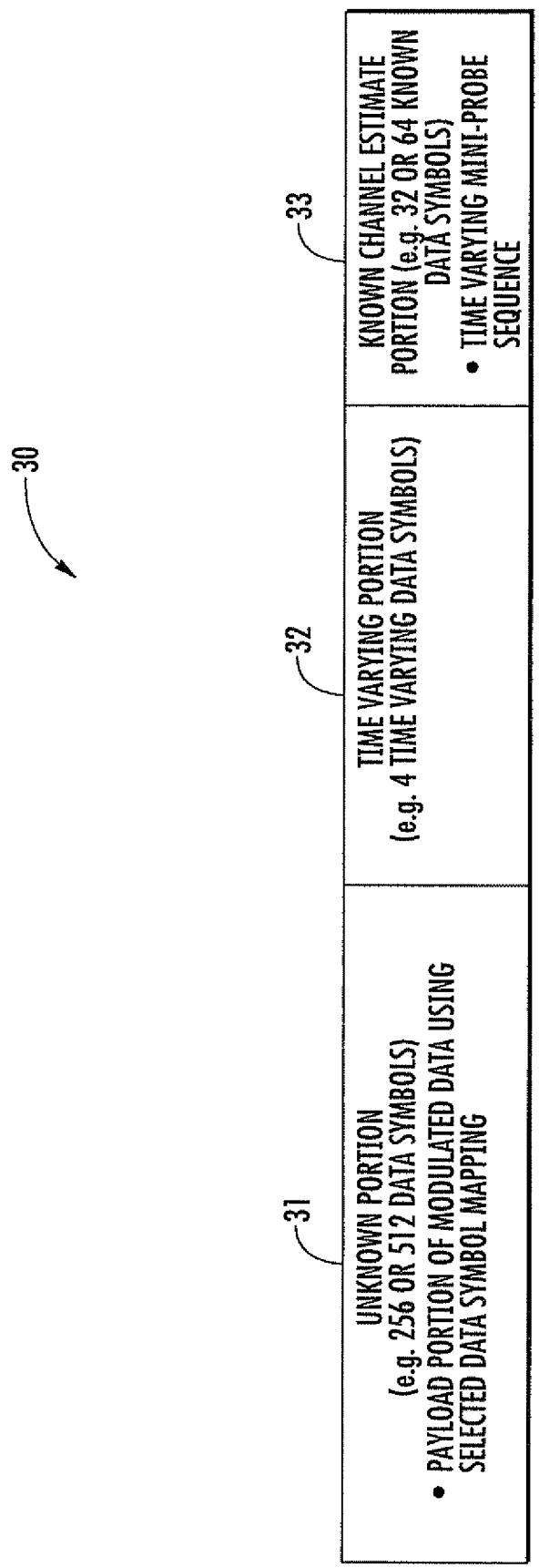
FIG. 3 is a schematic diagram of a frame structure used by the wireless communication system of FIG. 1.

Referring now additionally to FIG. 3, the wireless communication system 10 modulates data to define a frame structure 30 for transmission. The frame structure 30 illustratively includes a time-varying portion 32, an unknown portion 31, i.e. data portion, and a known channel estimate portion 33 for providing, as appreciated by those skilled in the art, the ability to send data and to track a time-varying channel. For example, the unknown portion 31 may include 256 or 512 data symbols.

The time-varying portion 32 illustratively includes 4 time-varying data symbols, for example. As will be appreciated by those skilled in the art, in some embodiments, it may be desirable to make the time-varying portion 32 of mini-probe (portions 32-33) as small as possible, for example, 4 data symbols for a 36 data symbol length mini-probe for a channel estimate of 16 taps). As will be appreciated by those skilled in the art, when using minimum length time-varying mini-probe 4+32 data symbols), multiple hypotheses for right hand side of block equalization process are required.

In other applications, it may be desirable to add, for example, 16 more known data symbols before the time-varying portion 32 so that the equalizer does not have to make multiple hypotheses in the equalization process. So the mini-probe portion would be (16+4+32 data symbols) where the 4 data symbols in the middle are the time-varying portion 32. The first 16 data symbols are known and allow the block equalizer receive processing to work without needing to hypothesize the 4 time-varying data symbols. So first part of the mini-probe portion should be the length of the channel estimate 33. The middle portion (time-varying portion) 32 should be related to the memory of the CPM waveform being used, and the last portion should be twice the length of the desired channel estimate, i.e. for a channel estimate of length 16 symbols, last portion should be about 32 symbols.

For example, the known channel estimate portion 33 may comprise 32 or 64 known data symbols, respectively. The time-varying portion 32 is used by modulator 22 to drive the state of the GMSK modulator to a known starting state so that the channel estimate portion 33, i.e. known data symbols, can be transmitted to receiver and processed by receiver using the known starting state resulting from the time-varying portion.

Figure 4:
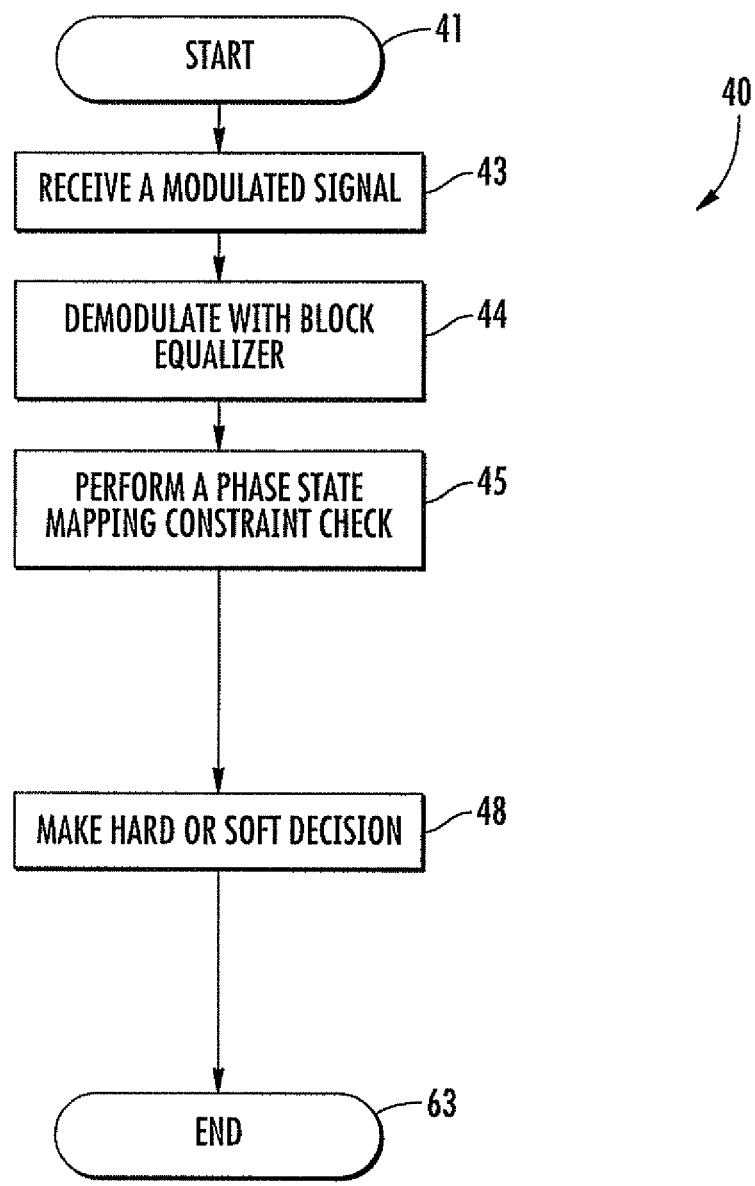
FIG. 4 is a flowchart illustrating operation of the receiver wireless communications device of FIG. 1.

Referring now to FIGS. 1 and 4, the receiver section 12 of the second wireless communications device 24 illustratively includes a wireless receiver 16, an antenna 14 coupled to the wireless receiver, and a demodulator 23 coupled to the wireless receiver for demodulating the Gaussian phase shift keyed signal from the first wireless communications device 19 using memory-less symbol decisions based upon the selected data symbol mapping, i.e. the selected binary input data to GMSK symbol mapping. The second wireless communications device 24 also illustratively includes a housing 20, for example, a plastic or rubberized housing, carrying these internal components.

The process of demodulating the Gaussian phase shift keyed signal is illustrated in flowchart 40 and begins at Block 41. Once the Gaussian phase shift keyed signal is received at Block 43, the process moves to Block 44 for demodulation of the received Gaussian phase shift keyed signal with a block equalizer, which equalizes the entire unknown portion 31. The block equalizer uses a clamping device to make symbol decisions and includes a rotating 4-PSK constellation, where even indexes have a 0 degree rotated 4-PSK constellation and odd indexes have a 45 degree rotated 4-PSK constellation (or vice versa), as will be appreciated by those skilled in the art.

In the illustrated embodiment, the demodulator 23 performs at Block 45 a phase state mapping constraint check on the demodulated Gaussian phase shift keyed signal before the decision portion. In other words, the demodulator 23 may review the demodulated signal for mapping flaws, for example, where the modulation moves from phase state 0 to phase state 3 (FIG. 2: modulation may move from phase state 0 only to phase states 1 or 7). When a flaw is detected, the symbol estimates resulting from the block equalizer can be modified, i.e. made smaller so that soft decisions become smaller (less confidence on decision) or data may be interpolated by last and next symbol estimates. In other embodiments, the constraint check Block 45 may be omitted. The method continues to Block 48 for the making of hard or soft decisions on the Gaussian phase shift keyed signal, and the method ends at Block 63.

Figure 6:
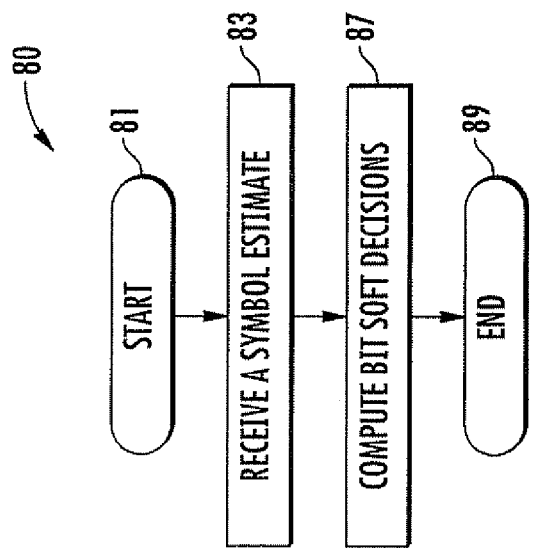
FIG. 6 is a flowchart illustrating operation of a soft decision device in the receiver wireless communications device of FIG. 1.
Figure 5:
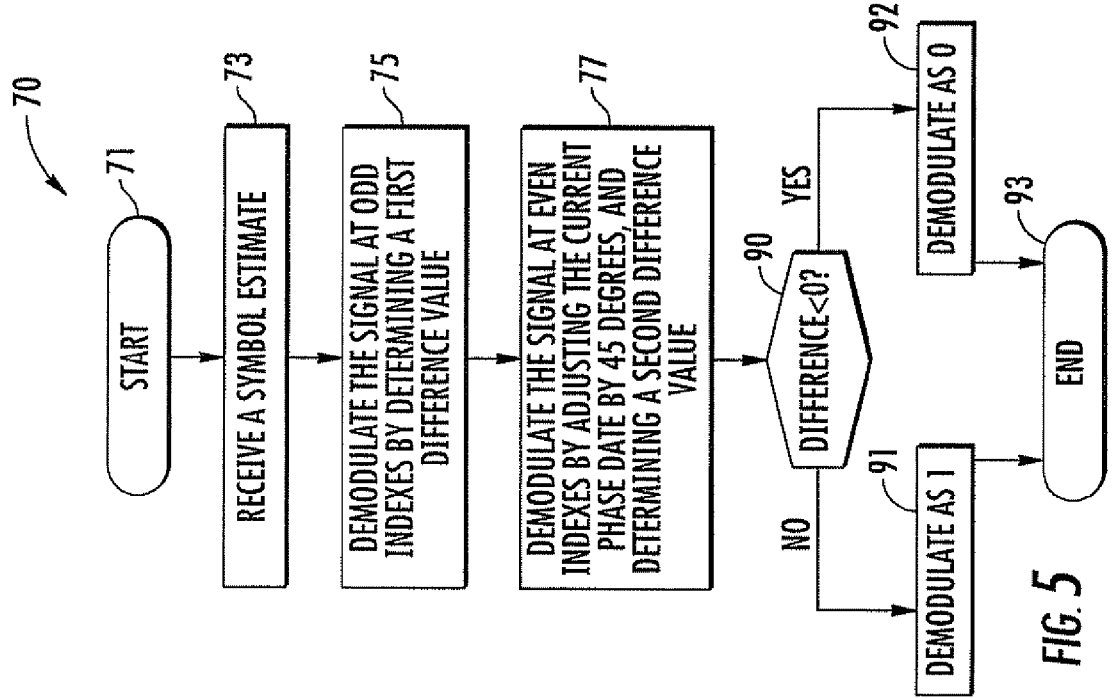
FIG. 5 is a flowchart illustrating operation of a hard decision device in the receiver wireless communications device of FIG. 1.

As discussed above, the demodulation decision process (Block 48) may be either soft decision or hard decision. Referring now additionally to FIGS. 5 and 6, more particularly to flowchart 70, an embodiment that demodulates using hard decisions is now described and begins at Block 71 and illustratively includes at Block 73 receiving symbol estimates. In other words, this flowchart 70 illustrates operation of an embodiment of the second wireless communications device 24 that includes a hard decision device.

At Block 75, the demodulator 23 demodulates the Gaussian phase shift keyed signal at odd indexes by at least determining a first difference between absolute values of corresponding real and imaginary values of a demodulated symbol estimate of the Gaussian phase shift keyed signal. More specifically, the demodulator 23 operates to demodulate the signal at odd indexes based upon the following formula:

$$\text{Soft decision} = \text{absolute value}(\text{real}) - \text{absolute value}(\text{imag}) \quad (1)$$

where
real=real part of demodulated symbol estimate, and
imag=imaginary part of demodulated symbol estimate.

Further, at Block 77, the demodulator 23 demodulates the Gaussian phase shift keyed signal at even indexes by at least adjusting the demodulated symbol estimate by 45 degrees, and determining a second difference between absolute values of corresponding real and imaginary values of the adjusted demodulated symbol estimate of the Gaussian phase shift keyed signal. More specifically, the demodulator 23 operates to demodulate the signal at even indexes based upon the following formula:

$$\text{Soft decision} = \text{absolute value (real')} - \text{absolute value (imag')} \quad (2)$$

where
real'=real part of the demodulated symbol estimate rotated 45 degrees counterclockwise, and
imag'=imaginary part of the demodulated symbol estimate rotated 45 degrees counterclockwise.

In the illustrated embodiment (FIG. 5), the demodulator 23 determines the appropriate difference value at Blocks 75 and 77 and decodes (Block 90) the value as a first logic state (Block 92), for example, a "0", when the difference is less than zero and as a second logic state (Block 91), for example, a "1", when the difference is greater than zero. The hard decision process ends at Block 93. In other words, the block equalizer clamps the demodulated symbol estimates based upon a rotating 4-phase shift keyed signal constellation.

In the hard decision embodiments, the clamping device may use the above discussed hard decision algorithm to pick the right rotating 4-PSK constellation point. More specifically, the following program code may be used to implement the clamping device.

```
int FindClosestGMSK(complex *symbol_est, int odd) {int
winner;
    if (!odd) {
        float val_x,val_y;
        complex temp=(*symbol_est);
        temp = product(temp, forty_five_degrees);
        val_x = ABS(temp.x);
        val_y = ABS(temp.y);
        if (val_x > val_y) {
            if (temp.x > 0.0)
                winner = 7;
            else
                winner = 3;
        }
        else {
            if (temp.y > 0.0)
                winner = 1;
            else
                winner = 5;
        }
    }
    else {
        float val_x=ABS(symbol_est->x),
              val_y=ABS(symbol_est->y);
        if (val_x > val_y) {
            if (est->x > 0.0)
                winner = 0;
            else
                winner = 4;
        }
        else {
            if (est->y > 0.0)
                winner = 2;
            else
                winner = 6;
        }
    }
    return(winner);
}
Where complex is a structure defined as
typedef struct { float x,y; } complex.
```

As will be appreciated by those skilled in the art, Blocks 90-92 illustrate an exemplary implementation of the hard decision process and other hard decision processes may be used. Moreover, in other embodiments (not shown), equations 1 and 2 can be used to provide bit soft decisions to a soft decision device, such as, a forward error correction device.

Referring to flowchart 80, which illustrates the process of decoding based upon soft decisions, the process begins at Block 81 and illustratively includes receipt of symbol estimates at Block 83. In other words, this flowchart 80 illustrates operation of an embodiment of the second wireless communications device 24 that includes a soft decision device. At Block 87, the bit soft decision estimate is computed using equations 1 and 2 and provided, for example, to a forward error correction process, as will be appreciated by those skilled in the art. The soft decision process ends at Block 89.

Advantageously, the second wireless communications device 24 may demodulate the Gaussian phase shift keyed signal, which was modulated using memory and the selected mapping shown in FIG. 2, using non-memory decisions. Indeed, the demodulator 23 uses simple arithmetic to demodulate the Gaussian phase shift keyed signal.

Additionally, as will be appreciated by those skilled in the art, the demodulator 23 may comprise a block equalizer demodulator. In other words, the demodulator 23 is based upon a block equalizer. For example, the demodulator 23 may comprise a data directed block equalizer as modified by the disclosure herein, as available from the Harris Corporation of Melbourne, Fla., the assignee of the present application. Advantageously, the block equalizer is less computationally complex and involves fewer resources, for example, SRAM memory, than the typical memory-based demodulators, i.e. maximum likelihood sequence estimators. As will be appreciated by those skilled in the art, in these embodiments, the demodulator 23 uses multiple hypotheses for one side of the block equalizer (for the case of the minimum length time-varying mini-probe).

Advantageously, the Gaussian phase shift keyed signal as disclosed in the wireless communication system 10 described above doubles the data transmission rate of typical GMSK. Moreover, the Gaussian phase shift keyed signal provides greater capacity while maintaining a constant radio frequency (RF) envelope, and provides better performance over typical constant envelope orthogonal frequency-division multiplexing (CE-OFDM) systems, which provide close to the same user throughput, i.e. close to the same bits per second. Nonetheless, the wireless communication system 10 may use a greater signal-to-noise ratio than the typical GMSK system, for example, 9 dB greater.

Another aspect is directed to a wireless communications device 19. The wireless communications device 19 may include a wireless transmitter 15, and a modulator 22 coupled to the wireless transmitter for modulating input data to generate a Gaussian phase shift keyed signal having a selected data symbol mapping and having a modulation index of 0.25.

Yet another aspect is directed to a method for operating a wireless communication system 10 having a first wireless communications device 19 and a second wireless communications device 24 communicating therewith. The method may include modulating at the first wireless communications device 19 input data to generate a Gaussian phase shift keyed signal having a selected data symbol mapping, and demodulating at the second wireless communications device 24 the Gaussian phase shift keyed signal using memory-less symbol decisions based upon the selected data symbol mapping.

Another aspect is directed to a method for operating a wireless receiver 24 receiving a Gaussian phase shift keyed signal having a selected data symbol mapping. The method may comprise demodulating the Gaussian phase shift keyed signal using memory-less symbol decisions based upon the selected data symbol mapping.

Other features relating to wireless communications devices are disclosed in co-pending application "WIRELESS COMMUNICATIONS DEVICE FOR SIGNAL WITH SELECTED DATA SYMBOL MAPPING AND RELATED METHODS", U.S. Pat. No. 8,204,157 issued Jun. 19, 2012, incorporated herein by reference in its entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communication system comprising:
a first wireless communications device comprising
a wireless transmitter, and
a modulator coupled to said wireless transmitter and configured to modulate input data to generate a Gaussian phase shift keyed signal having a selected data symbol mapping; and
a second wireless communications device comprising
a wireless receiver, and
a demodulator coupled to said wireless receiver and configured to demodulate the Gaussian phase shift keyed signal using
memory-less symbol decisions based upon the selected data symbol mapping,
at odd symbol indexes, a calculation of a first difference value of absolute values of corresponding real and imaginary values of a current received symbol estimate of the Gaussian phase shift keyed signal, and
at even symbol indexes, a calculation of a second difference value of absolute values of corresponding real and imaginary values of a phase shifted version of the current received symbol estimate of the Gaussian phase shift keyed signal.

2. The wireless communication system according to claim 1 wherein the Gaussian phase shift keyed signal has 8 phase states, each phase state being spaced apart by 45 degrees.

3. The wireless communication system according to claim 1 wherein said modulator is configured to selectively map the input data using memory by at least mapping the input data based upon at least one of a prior phase state of the Gaussian phase shift keyed signal and a current phase state of the Gaussian phase shift keyed signal.

4. The wireless communication system according to claim 3 wherein said modulator is configured to selectively map the input data into phase states adjacent to the prior phase state of the Gaussian phase shift keyed signal.

5. The wireless communication system according to claim 1 wherein said modulator is configured to modulate the input data to define a frame structure including a known portion, a time-varying portion, and an unknown portion; wherein the unknown portion includes 256 data symbols; wherein the time-varying portion comprises 4 data symbols; and wherein the known portion includes 32 known data symbols.

6. The wireless communication system according to claim 1 wherein said modulator is configured to modulate the input data to define a frame structure including a known portion, a time-varying portion, and an unknown portion; wherein the unknown portion includes 512 data symbols; wherein the time-varying portion comprises 4 data symbols; and wherein the known portion includes 64 known data symbols.

7. The wireless communication system according to claim 1 wherein the Gaussian phase shift keyed signal has a Gaussian shaped pulse spread across three data symbols.

8. A method for operating a wireless communication system having a first wireless communications device and a second wireless communications device communicating therewith, the method comprising:
   modulating at the first wireless communications device input data to generate a Gaussian phase shift keyed signal having a selected data symbol mapping; and
   demodulating at the second wireless communications device the Gaussian phase shift keyed signal using memory-less symbol decisions based upon the selected data symbol mapping,
   at odd symbol indexes, a calculation of a first difference value of absolute values of corresponding real and imaginary values of a current received symbol estimate of the Gaussian phase shift keyed signal, and
   at even symbol indexes, a calculation of a second difference value of absolute values of corresponding real and imaginary values of a phase shifted version of the current received symbol estimate of the Gaussian phase shift keyed signal.

9. The method according to claim 8 wherein the Gaussian phase shift keyed signal has 8 phase states, each phase state being spaced apart by 45 degrees.

10. The method according to claim 8 wherein modulating further comprises selectively mapping the input data using memory by at least mapping the input data based upon a prior phase state of the Gaussian phase shift keyed signal.

* * * * *